US012535930B2

(12) United States Patent
Humphrey et al.

(10) Patent No.: US 12,535,930 B2
(45) Date of Patent: Jan. 27, 2026

(54) INTEROPERABILITY FOR TRANSLATING AND TRAVERSING 3D EXPERIENCES IN AN ACCESSIBILITY ENVIRONMENT

(71) Applicant: MICROSOFT TECHNOLOGY LICENSING, LLC, Redmond, WA (US)

(72) Inventors: Brett D. Humphrey, Seattle, WA (US); Kian Chai Ng, Redmond, WA (US); Thomas Matthew Gable, Seattle, WA (US); Amichai Charnoff, Washington, DC (US); Martin Grayson, Bedford (GB); Rita Faia Marques, Cambridge (GB); Cecily Peregrine Borgatti Morrison, Cambridge (GB); Harshadha Balasubramanian, Hatfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 294 days.

(21) Appl. No.: 18/193,430

(22) Filed: Mar. 30, 2023

(65) Prior Publication Data

US 2024/0118785 A1 Apr. 11, 2024

Related U.S. Application Data

(60) Provisional application No. 63/414,432, filed on Oct. 7, 2022.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/0482* (2013.01);
(Continued)

(58) Field of Classification Search
None
See application file for complete search history.

(56) References Cited

U.S. PATENT DOCUMENTS 8,645,846 B2 * 2/2014 Cragun ............... G06F 3/04815
715/729
9,418,330 B2 * 8/2016 Hamilton, II ....... G06F 3/04847
(Continued)

FOREIGN PATENT DOCUMENTS

EP 4016434 A1 6/2022

OTHER PUBLICATIONS

International Search Report and Written Opinion received for PCT Application No. PCT/US2023/031448 Feb. 5, 2024, 21 pages.
(Continued)

*Primary Examiner* — Christopher J Fibbi
(74) *Attorney, Agent, or Firm* — Newport IP, LLC; Jacob P. Rohwer

(57) ABSTRACT

The techniques disclosed herein enable systems to translate three-dimensional experiences into user accessible experiences to improve accessibility for users with disabilities. This is accomplished by extracting components from a three-dimensional environment such as user avatars and furniture. The components are organized into component groups based on shared attributes. The component groups are subsequently organized into a flow hierarchy. The flow hierarchy is then presented to the user in an accessibility environment that enables interoperability with various accessibility tools such as screen readers, simplified keyboard inputs, and the like. Selecting a component group, and
(Continued)

subsequently, a component through the accessibility environment accordingly invokes functionality within the three-dimensional environment. In this way, users with disabilities are empowered to fully interact with three-dimensional experiences.

12 Claims, 14 Drawing Sheets

(51) Int. Cl.
*G06F 3/0482* (2013.01)
*G06F 3/0484* (2022.01)
*G06F 3/16* (2006.01)
*G06T 19/20* (2011.01)
*H04M 1/72481* (2021.01)
*H04S 7/00* (2006.01)

(52) U.S. Cl.
CPC ............ *G06F 3/0484* (2013.01); *G06F 3/167* (2013.01); *G06T 19/20* (2013.01); *H04M 1/72481* (2021.01); *H04S 7/302* (2013.01); *G06T 2200/24* (2013.01); *G06T 2219/2024* (2013.01); *H04S 2400/11* (2013.01)

(56) References Cited

U.S. PATENT DOCUMENTS

| | | | |
|---|---|---|---|
| 11,126,320 | B1 | 9/2021 | Thompson |
| 11,709,898 | B1* | 7/2023 | Stephen ................ G06F 16/986 707/781 |
| 2010/0083139 | A1 | 4/2010 | Dawson |
| 2010/0203968 | A1 | 8/2010 | Gill et al. |
| 2013/0263017 | A1 | 10/2013 | Moyers et al. |
| 2015/0243288 | A1* | 8/2015 | Katsuranis .............. G06F 9/451 715/764 |
| 2016/0055138 | A1* | 2/2016 | Broz .................... G06F 40/169 715/230 |
| 2019/0075417 | A1 | 3/2019 | Rasheed |
| 2019/0302255 | A1 | 10/2019 | Clark |
| 2019/0310757 | A1 | 10/2019 | Lee |
| 2019/0369836 | A1 | 12/2019 | Faulkner |
| 2021/0055801 | A1 | 2/2021 | Lee |
| 2022/0197403 | A1 | 6/2022 | Hughes |
| 2023/0117304 | A1 | 4/2023 | Sears |
| 2023/0241518 | A1* | 8/2023 | Makkar ................... A63F 13/87 463/42 |
| 2023/0281940 | A1 | 9/2023 | Shen |
| 2023/0350967 | A1* | 11/2023 | Newman ............. G06F 16/9577 |
| 2024/0069857 | A1* | 2/2024 | Francis ............... G06F 3/04842 |
| 2024/0119685 | A1 | 4/2024 | Humphrey |

OTHER PUBLICATIONS

International Search Report and Written Opinion received for PCT Application No. PCT/US2023/031457 Feb. 5, 2024, 20 pages.

"Microsoft Soundscape", Retrieved From: https://web.archive.org/web/20220605082641/https://www.microsoft.com/en-us/research/product/soundscape/, Jun. 5, 2022, 3 Pages.

"Responsive Spatial Audio for Immersive Gaming", Retrieved From: https://web.archive.org/web/20190720040907/https://www.microsoft.com/en-US/garage/profiles/responsive-spatial-audio-for-immersive-gaming/, Jul. 20, 2019, 5 Pages.

"Seeing AI in new languages", Retrieved From: https://web.archive.org/web/20191205195151/https://www.microsoft.com/en-us/ai/seeing-ai, Dec. 5, 2019, 4 Pages.

Bridge, et al., "Keyboard interactions", Retrieved From: https://learn.microsoft.com/en-us/windows/apps/design/input/keyboard-interactions, May 14, 2022, 30 Pages.

Zhao, et al., "SeeingVR: A Set of Tools to Make Virtual Reality More Accessible to People with Low Vision", In Proceedings of the 2019 CHI Conference on Human Factors in Computing Systems, May 2, 2019, 14 Pages.

International Preliminary Report on Patentability received for PCT Application No. PCT/US23/031448, Apr. 17, 2025, 13 pages.

International Preliminary Report on Patentability received for PCT Application No. PCT/US23/031457, Apr. 17, 2025, 13 pages.

Invitation to Pay Additional Fees received for PCT Application No. PCT/US2023/031448, Mailed on Dec. 15, 2023, 13 pages.

Invitation to Pay Additional Fees received for PCT Application No. PCT/US2023/031457, Mailed on Dec. 15, 2023, 12 pages.

Non-Final Office Action mailed on Jun. 9, 2025, in U.S. Appl. No. 18/193,373, 18 pages.

\* cited by examiner

INTEROPERABILITY FOR TRANSLATING AND TRAVERSING 3D EXPERIENCES IN AN ACCESSIBILITY ENVIRONMENT

PRIORITY APPLICATION

The present application is a non-provisional application of, and claims priority to, U.S. Provisional Application Ser. No. 63/414,432 filed on Oct. 7, 2022, entitled: INTEROPERABILITY FOR TRANSLATING AND TRAVERSING 2D AND 3D EXPERIENCES, the contents of which are hereby incorporated by reference in their entirety.

BACKGROUND

As remote work continues to grow in popularity, the use of communication and collaboration tools for facilitating engaging online meetings is becoming ubiquitous. One approach to improving the user experience of communication and collaboration tools is to host meetings within a virtual environment, often referred to as immersive meetings. Participants of immersive meetings can meet in a three-dimensional virtual environment and share content within those virtual environments. In many cases, the aim of these virtual environments is to provide an experience which emulates the sensation of real-life interaction between individuals and groups of people. In addition, user interactions enabled by the communication and collaboration tools can be enhanced by customizable avatars that graphically represent individual users which allow customization for expression of individuality.

Communication and collaboration tools include instant messaging, voice calls, video calls, group chat, shared desktop, shared media and content, shared applications, etc. Such tools can perform capture, manipulation, transmission, and reproduction of audio and visual elements, and use various combinations of such elements to provide an immersive virtual environment. However, despite the many benefits over other forms of collaboration, the use of three-dimensional environments, in both augmented reality and virtual reality, for sharing interaction and content can involve some drawbacks. For instance, differing availability of augmented reality or virtual reality devices can prevent some users from experiencing the immersion of a virtual environment.

These issues are exacerbated with respect to accessibility for users that have a disability. For example, a blind or visually impaired user may be unable to fully interact with the virtual environment. In an accessibility environment such as a two-dimensional experience, the blind or visually impaired user can utilize various accessibility features to interact with a computing device (e.g., a tablet, laptop, smartphone). One such accessibility feature is a screen reader which audibly describes, to the user, what is currently displayed on the screen such as user interface elements and their respective locations. Unfortunately, existing tools for producing three-dimensional environments often lack functionality for utilizing accessibility features. Consequently, users with disabilities cannot fully experience the three-dimensional environment.

SUMMARY

The techniques described herein provide systems for enhancing accessibility for users with disabilities in three-dimensional virtual environments by introducing interoperability between three-dimensional and accessible user experiences such as a two-dimensional menu environment, an auditory environment, a haptic environment, and so forth. This is accomplished by extracting the various components from a three-dimensional environment such as user interface elements, renderings of user avatars, and three-dimensional objects. The extracted components are then organized into groups to form a flow hierarchy based on shared attributes. For instance, user interface elements can form one group while attendees of the meeting, both two-dimensional and three-dimensional, form another group.

As mentioned above, conventional approaches for creating three-dimensional environments and experiences (e.g., graphical engines such as UNITY) often lack accessibility features for users with disabilities including those with limited sight, mobility, and/or dexterity. For example, a blind or visually impaired user may be unable to fully interact with a three-dimensional environment, requiring additional tools such as voice commands and a screen reader to interact with displayed content and experiences. In various examples, a screen reader requires on-screen content to be formatted such that it can be properly processed (e.g., HTML). In another example, a user with limited mobility may be able to use a head-mounted device to view a three-dimensional environment but may be unable to use the associated remotes for interaction thereby requiring a simplified method of user input such as a keyboard.

Organizing the components of the three-dimensional environment into a grouped flow hierarchy enables the use of various accessibility features that are typically unavailable in three-dimensional environments such as screen readers, voice commands, and simplified keyboard inputs. For instance, the flow hierarchy can be formatted for processing by a screen reader and subsequently communicated though audio to a user who is blind or visually impaired. Accordingly, the user can select one of the groups to receive additional information as well as interact with the components of the selected group. In this way, blind or visually impaired users are empowered to orient themselves and navigate a three-dimensional space.

In another example of the technical benefit of the present disclosure, the interoperability introduced by the flow hierarchy can enable a user who utilizes simplified or alternative input methods (e.g., voice commands, keyboard inputs) to take part in three-dimensional experiences. Consider a user who may be unable to use required hardware for engaging with a three-dimensional environment (e.g., a head-mounted display device, handheld controllers) due to limited mobility or other constraints. By constructing the flow hierarchy, the disclosed system can be configured to present a specialized accessible user interface. The accessible user interface enables a user to use inputs such as individual button presses and/or voice commands to interact with the three-dimensional environment. Stated another way, the three-dimensional experience is transformed into a user accessible experience such as a two-dimensional experience or an auditory experience to improve accessibility and user engagement.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
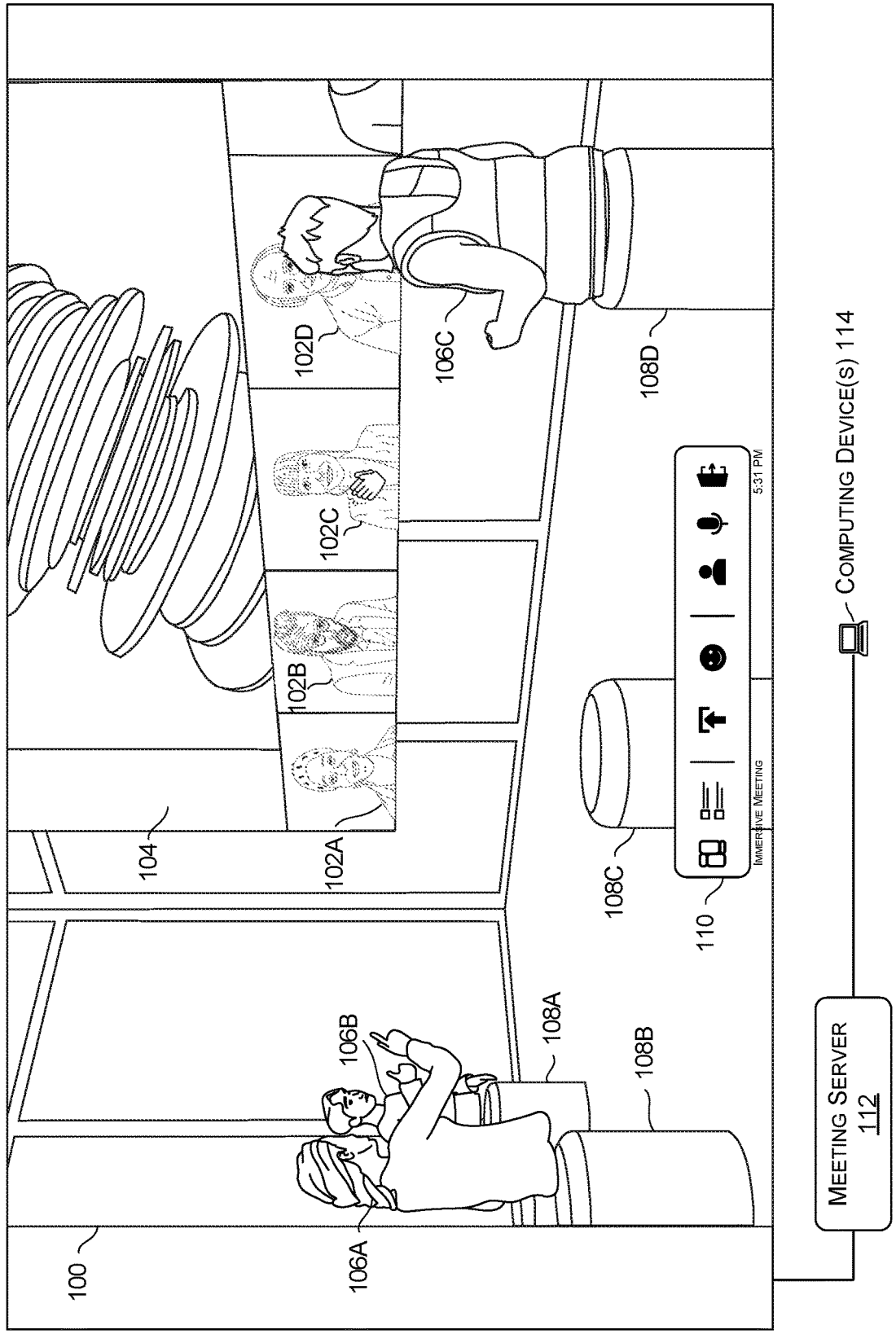
FIG. 1 illustrates an example user interface for a three-dimensional environment hosting an immersive meeting.

FIG. 1 illustrates a user perspective of an example of a three-dimensional environment 100 for hosting an immersive meeting which includes both two-dimensional and three-dimensional components. For example, users who are attending the immersive meeting can be displayed as a two-dimensional rendering of an image 102A-102D. Alternatively, a user can be displayed as a rendering of a three-dimensional representation of the user 106A-106C, also known as an avatar. In this example, the two-dimensional renderings 102A-102D are displayed on a virtual screen 104 within the three-dimensional environment 100.

Users attending the immersive meeting can be enabled to select a rendering type (e.g., two-dimensional, or three-dimensional). Conversely, a rendering type can be automatically assigned to the user. For instance, if a first user is utilizing a head-mounted display device, the system can still allow that user to provide an input to appear as a two-dimensional image (e.g., the rendering 102A), which can include a rendering of a still image of that user. Alternatively, the system may select a rendering type based on the device type for a user. For instance, if a second user utilizing a head-mounted display device, the system can cause that user to appear as a three-dimensional representation 106A. The three-dimensional environment 100 may also include various objects such as furniture 108A-108D and a virtual screen 104. Each user can transfer between rendering types by providing an input. For instance, a first user can appear as a two-dimensional image 102A and then provide an input to transfer to a three-dimensional representation 106A. The three-dimensional environment 100 can also provide system permissions that can be configured to allow users to move throughout the three-dimensional environment 100 and interact.

The three-dimensional environment 100 can also include a personal tray 110, which is a user interface element that enables a user to interact with the immersive meeting in various ways. For example, the user may access other applications while attending the immersive meeting to multitask (e.g., taking notes). The user can also share content, graphically express emotion, and view other attendees within the three-dimensional environment 100. Furthermore, the user can adjust hardware device settings such as microphones and leave the immersive meeting. Access to, and interaction with, the three-dimensional environment 100 can be facilitated by a meeting server 112 which coordinates various computing devices 114 associated with users attending the immersive meeting within the three-dimensional environment 100.

Figure 2:
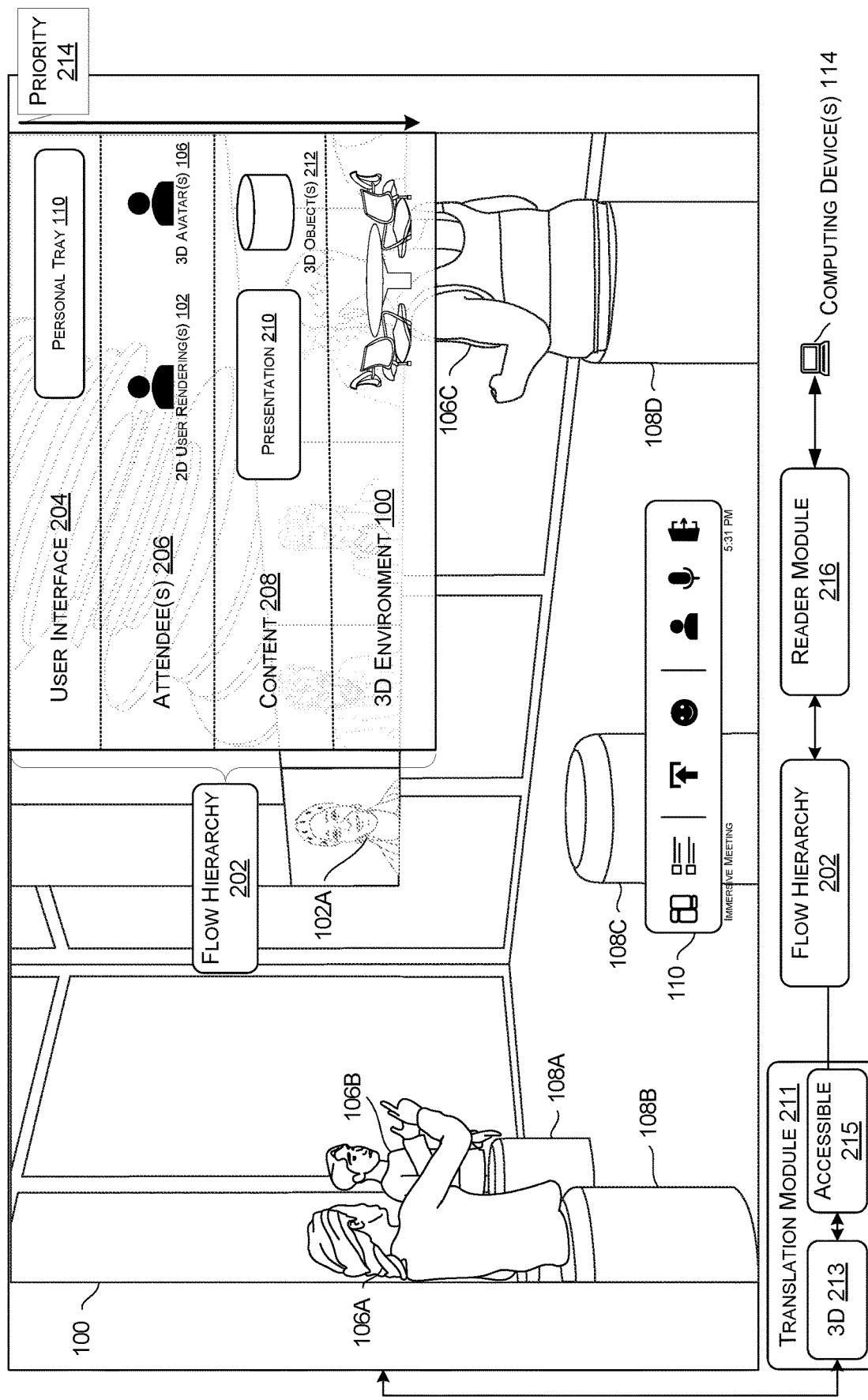
FIG. 2 illustrates the example user interface in the process of generating a flow hierarchy for enabling alternative interaction methods.

Turning to FIG. 2, the three-dimensional environment 100 is configured to generate a flow hierarchy 202 to enable use of various accessibility tools. The flow hierarchy 202 organizes the components of the three-dimensional environment 100 into component groups. In various examples, the flow hierarchy 202 is constructed by extracting and categorizing the components from the three-dimensional environment 100. The component groups include the user interface 204 (e.g., the personal tray 110), attendees 206 (e.g., two-dimensional user renderings 102, and three-dimensional avatars 106), content 208 (e.g., a presentation 210 displayed on the virtual screen 104 and three-dimensional objects such as the furniture 108), and the three-dimensional environment 100 (e.g., walls and windows). In various examples, the flow hierarchy 202 is arranged according to a priority 214. The priority 214 of a component group can be determined based on a likelihood of user interaction. For instance, a user may be more interested in interacting with the user interface 204 and other attendees 206 than virtual room components such as walls or windows. However, it should be understood that the flow hierarchy 202 can be arranged according to any suitable property.

As shown in FIG. 2, the flow hierarchy 202 can be generated using a transformation module 211 that receives the various components of the three-dimensional environment 100 such as the user avatars 106, furniture 108, and so forth in a 3D format 213 (e.g., UNITY). The components are then translated into an accessible format 215 (e.g., HTML) to construct the flow hierarchy 202. The flow hierarchy 202 can subsequently be provided to an accessibility tool such as a reader module 216, or screen reader. In this way, a blind or visually impaired user can be apprised of the many components that comprise the three-dimensional environment 100 in an organized and intuitive fashion. In another example, the flow hierarchy 202 is presented in an accessibility environment such as a two-dimensional menu with keyboard navigation inputs and/or voice commands.

Figure 3:
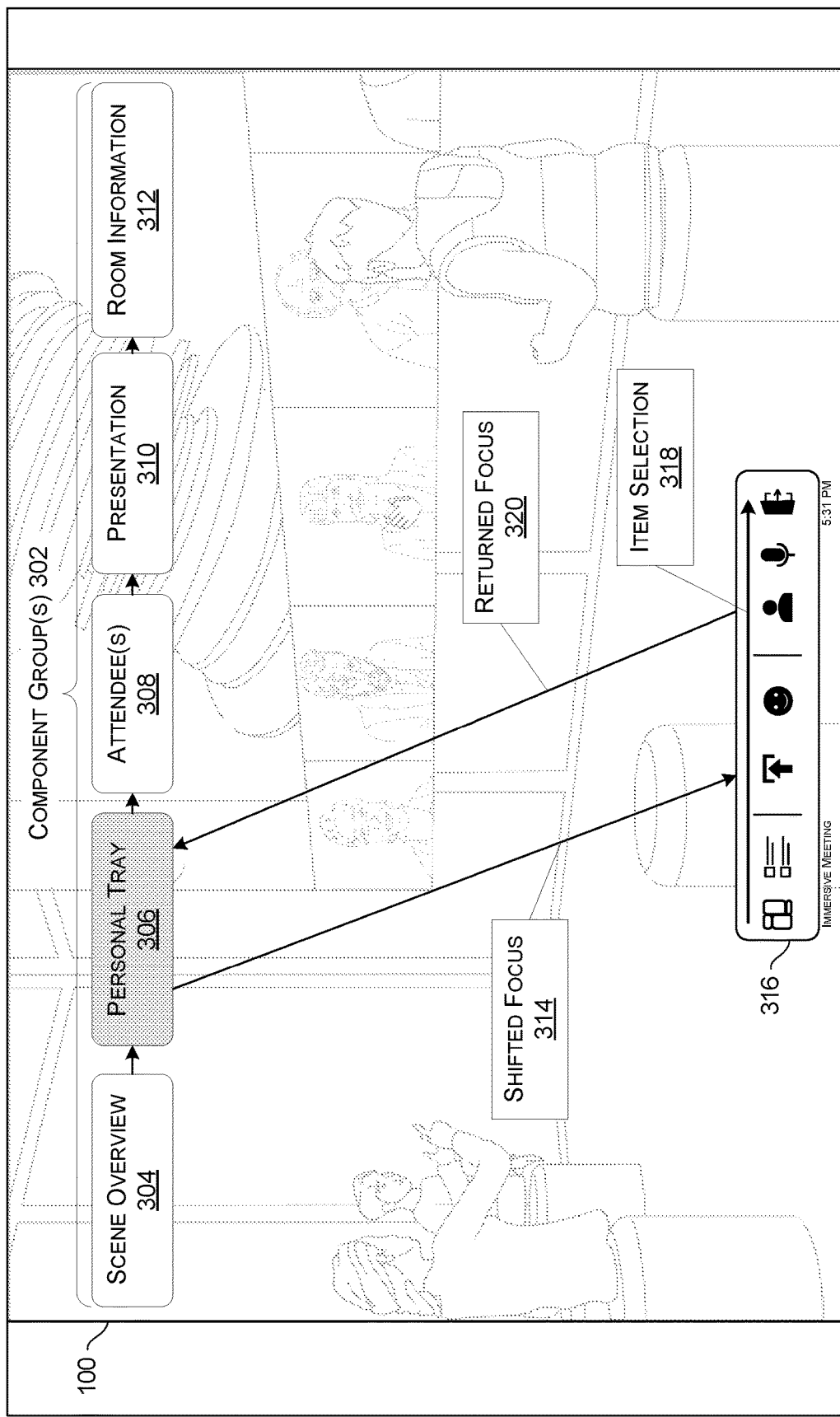
FIG. 3 illustrates a user input flow for interaction with component groups of the flow hierarchy.

Proceeding to FIG. 3, additional functionality enabled by the component groups comprising the flow hierarchy 202 is shown and described. As mentioned above, constructing the flow hierarchy 202 enables interoperability between the three-dimensional environment 100 and various accessibility tools to empower users with disabilities to engage with a three-dimensional experience in an accessibility environment. One such accessibility tool is simplified inputs which can replace or supplement typical user input methods for three-dimensional environments such as handheld remotes and/or head-mounted devices.

As shown in FIG. 3, various component groups 302 span the upper portion of this view of the three-dimensional environment 100 as an accessible menu. A component group categorizes the various components of the three-dimensional environment 100 such as the renderings of users 102 and 106, the furniture 108, and so forth. The component groups 302 include a scene overview group 304, a personal tray group 306, an attendees group 308, a presentation group 310, and a room information group 312. Presenting the component groups 302 in an accessibility environment such as a two-dimensional menu can enable a user to use simplified inputs instead of typical three-dimensional methods such as handheld remotes. Utilizing a first input (e.g., pressing "tab" on a keyboard) the user can advance through and select a component group 302. In this way, the component groups 302 provide functionality for a user with limited mobility and/or dexterity to freely interact with the three-dimensional environment 100.

In the present example, the user selects the personal tray 306 as indicated by the shading. This results in a shifted focus 314 to the personal tray user interface element 316. At this point, the user can utilize a second input (e.g., arrow keys, enter key) to perform an item selection 318 to invoke one of the functions associated with the personal tray user interface element 316 such as sharing content and/or viewing other users that are present within the three-dimensional environment 100. In addition, the item selection 318 can cause a returned focus 320 to the component groups 302 and/or the three-dimensional environment 100. Alternatively, the user can remain focused on the selected component group (e.g., the personal tray 306) and perform a third user input (e.g., pressing "escape" on the keyboard) to trigger the returned focus 320. Similar to the example discussed above with respect to FIG. 2, the present example can be enabled by a translation module 211 that generates a flow hierarchy 202. The flow hierarchy 202 is then used to generate the user accessible menu made up of the component groups 302.

Figure 4A:
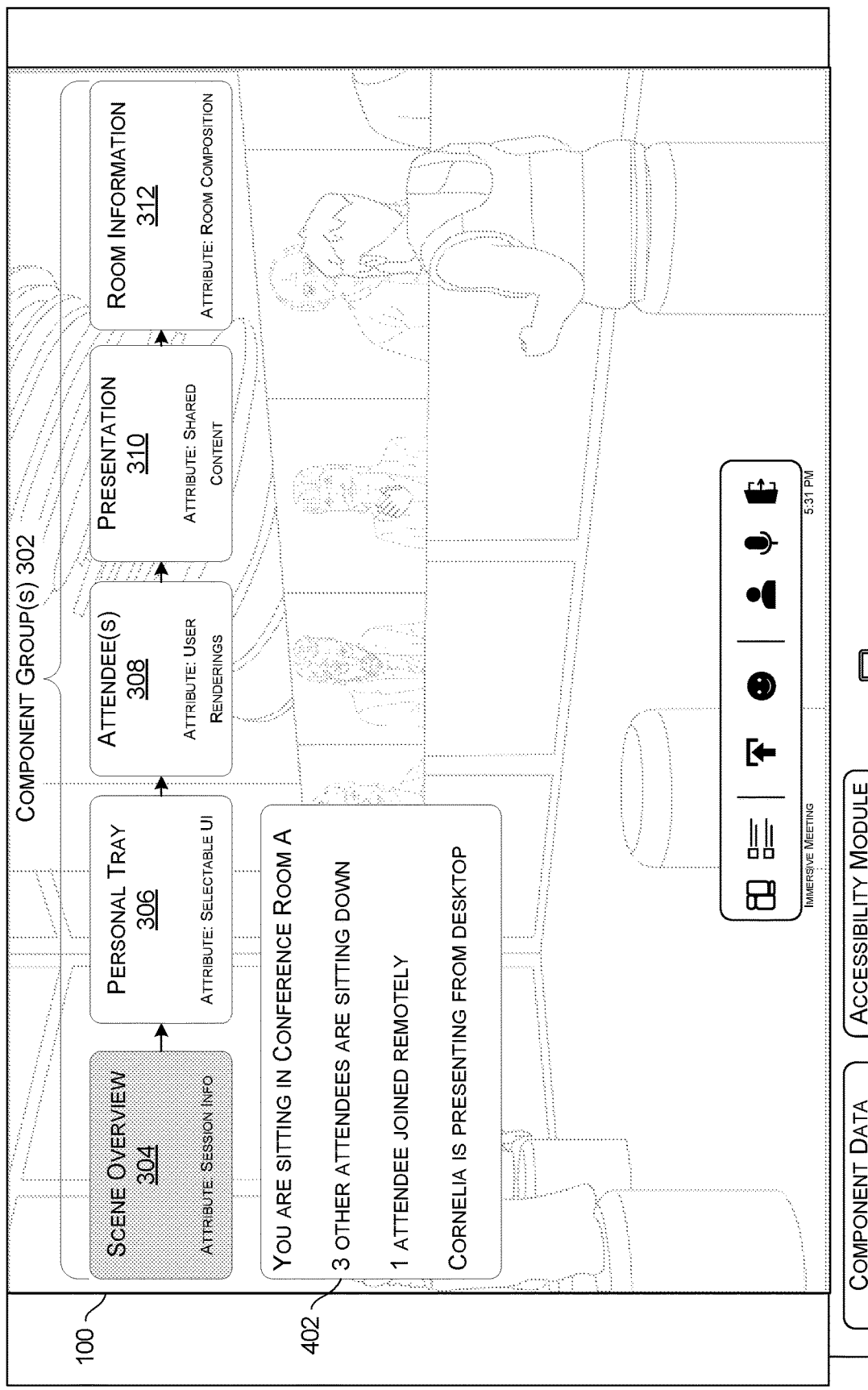
FIG. 4A illustrates a first interaction in response to a user input selecting a component group.

Turning now to FIG. 4A-4D, additional features and functionalities enabled by the component groups 302 are shown and described. As with the examples discussed above, the scenarios discussed with respect to FIGS. 4A-4D can utilize a translation module 211 to translate the three-dimensional environment 100 into an organized accessible menu system as illustrated. In the example of FIG. 4A, a user selects the scene overview 304. In response, a user interface element 402 presenting information about the three-dimensional environment 100 is displayed. For instance, the user interface element 402 informs the user of their current conference room, the status of other users within the three-dimensional environment 100, content currently being shared and/or presented, and so forth. Consequently, in this example, components (e.g., user interface elements) that are displayed and/or read out are associated with a shared attribute such as an "overview" label or tag.

In various examples, selecting the scene overview 304 causes the system to update a component data structure 404. The component data structure 404 can be a database defining the full set of components within the virtual environment 100. In addition, the component data structure 404 defines which of the components are provided to an accessibility module 406 (e.g., the reader module 216) for communication to a user. In response to selecting the scene overview 304, components of the scene overview 304 such as the user interface element 402 are tagged within the component data structure 404 for transmission to the accessibility module 406. Stated another way, components that are not associated with the scene overview 304 are tagged such that they are not transmitted to the accessibility module 406. In this way, the component groups 302 enable interoperability with accessibility tools and empower a user who is disabled to understand the present virtual environment 100 around them.

Figure 4B:
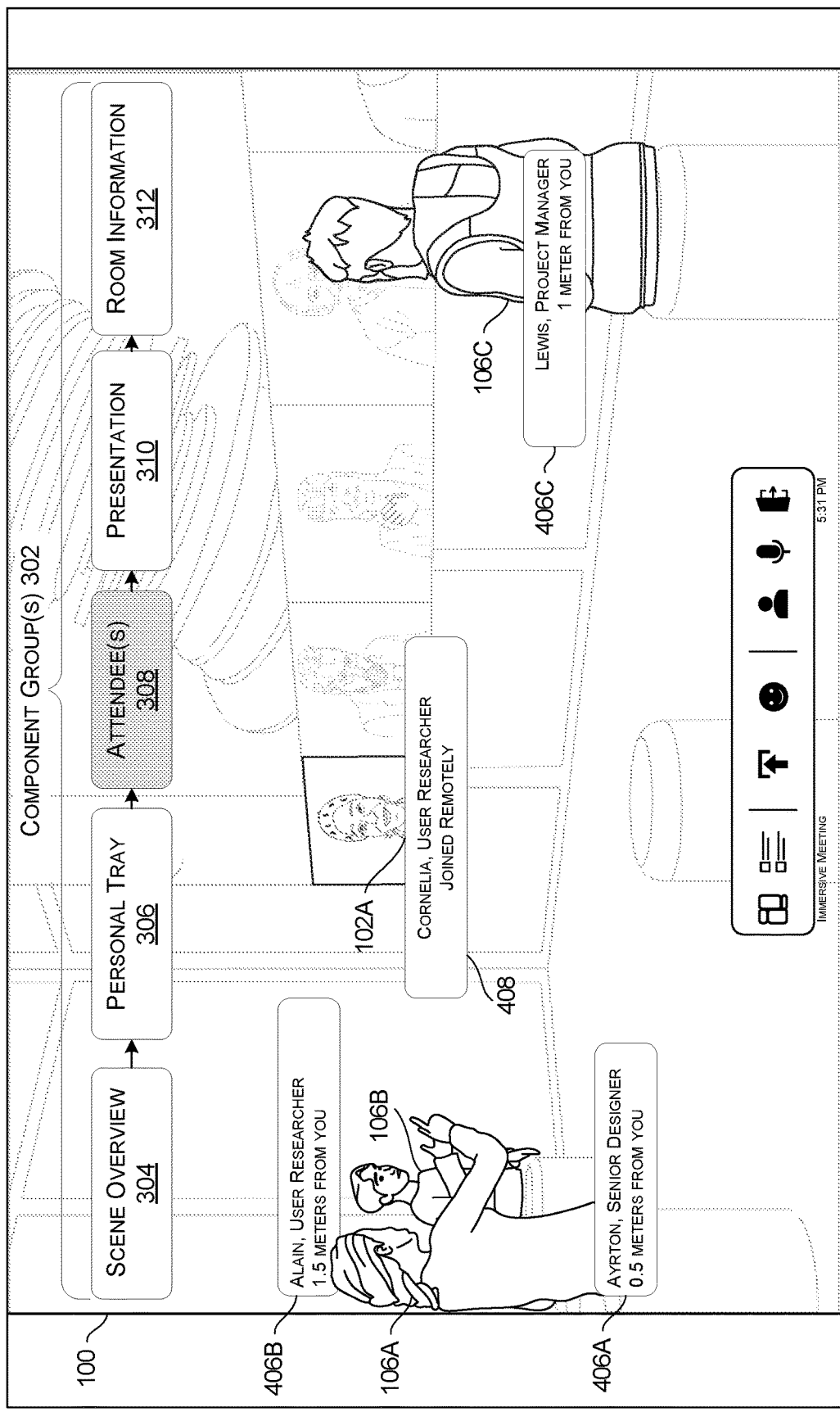
FIG. 4B illustrates a second interaction in response to a user input selecting a component group.

Proceeding to FIG. 4B, the user selects the attendees 308 from the component groups 302. In response, a plurality of user identifiers 406A-406C and 408 are generated and displayed to identify various users who are attending the immersive meeting within the three-dimensional environment 100. As discussed above, users can be presented within the three-dimensional environment 100 as a two-dimensional rendering of an image 102A or as a rendering of a three-dimensional representation of the user 106A-106C. Accordingly, the user identifiers 406A-406C and 408 are placed within the three-dimensional environment 100 so as to be visually associated with a respective two-dimensional rendering 102A and/or three-dimensional representation 106A-106C. For example, the user identifier 406A is placed in front of the three-dimensional representation 106A to identify the three-dimensional representation 106A as Ayrton, a senior designer. In addition, the user identifier 406A states that the three-dimensional representation 106A is 0.5 meters from the user's position within the three-dimensional environment 100. Accordingly, the user can select one of the user identifiers 406 to invoke various functionalities within the three-dimensional environment 100. For example, selecting the user identifier 406A can cause the user to move to the user three-dimensional representation 106A for Ayrton. Alternatively, selecting the user identifier 406A can surface additional information for Ayrton such as contact information, current status, location, and the like. Consequently, in this example, components (e.g., user interface elements) that are displayed and/or read out are associated with a shared attribute such as an a "user", "participant", or "attendee" in the 3D environment. It should be understood that such identifiers can be generated for any components in response to a selection of a component group 302.

Similar to the example discussed above with respect to FIG. 4A, selecting the attendees 308 component group 302 causes an update to the component data structure 404. As a result of the update, components of the attendees 308 such as the user identifiers 406A-406C and 408 are tagged within the component data structure 404 for transmission to the accessibility module 406. Conversely, components not associated with the attendees 308 such as the personal tray 306 are not tagged for transmission and are thus not communicated to the user via the computing device 114. Accordingly, the user identifiers 406A-406C and 408 are communicated to the user via utilizing the user's preferred modality such as audio, magnified visuals, haptic feedback and so forth. In this way, a user with disabilities can gain a sense of position and space with respect to fellow users within the three-dimensional environment 100.

Figure 4C:
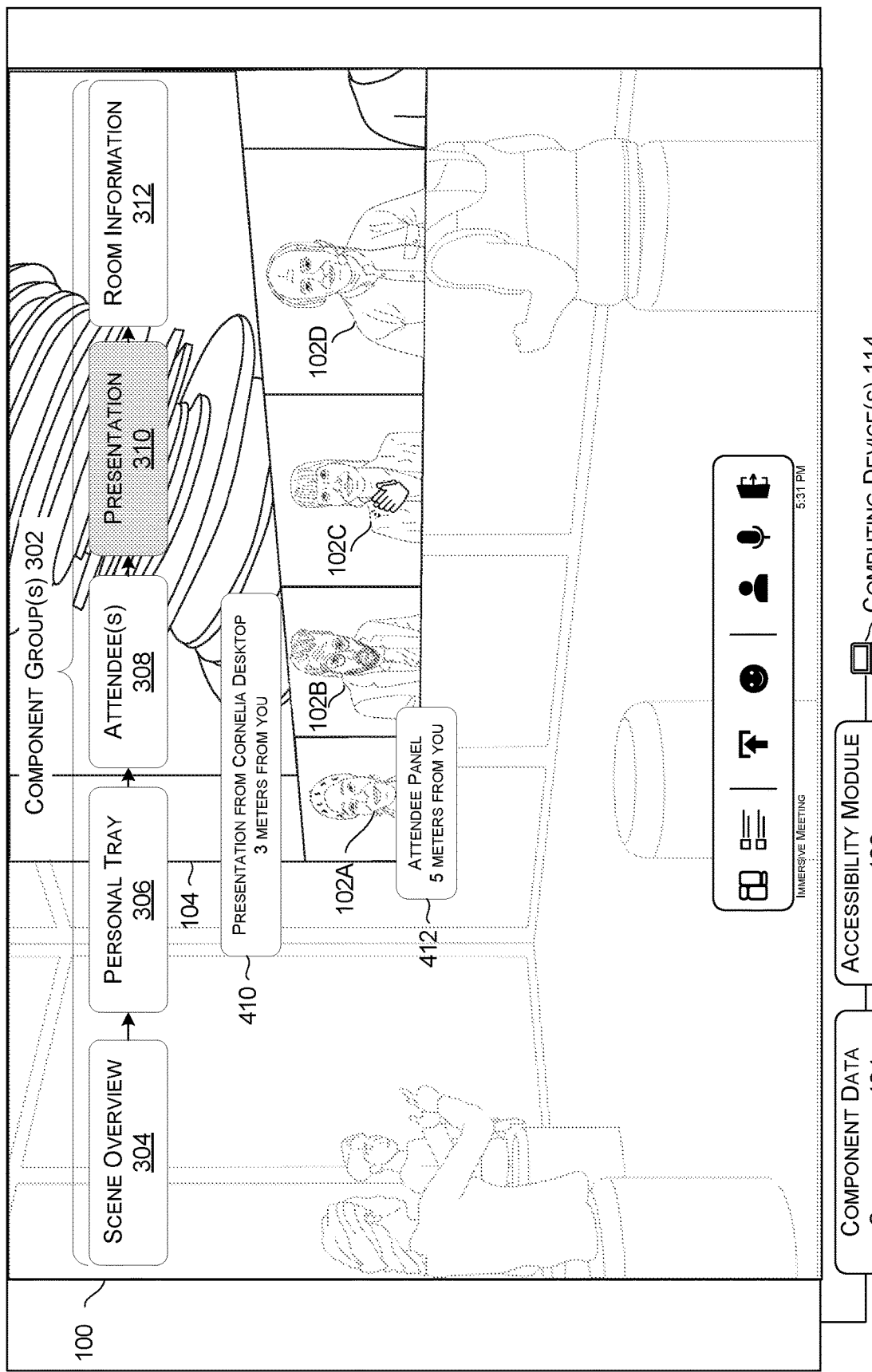
FIG. 4C illustrates a third interaction in response to a user input selecting a component group.

Turning now to FIG. 4C, the user selects the presentation 310 from the component groups 302. In response, informational panels 410 and 412 are generated and presented within the three-dimensional environment 100 to identify the virtual screen 104 and any content currently being presented. Similar to the user identifiers 406A-406C and 408, the informational panels 410 and 412 are positioned within the three-dimensional environment 100 to be visually associated with the virtual screen 104. As shown, the informational panel 410 states that a presentation from Cornelia's desktop is currently displayed on the virtual screen three meters from the user. In addition, the informational panel 412 states that the attendee panel displaying various users appearing as a two-dimensional renderings of an image 102A-102D is five meters from the user. Consequently, in this example, components (e.g., user interface elements) that are displayed and/or read out are associated with a shared attribute such as "content presentation" in the 3D environment.

Furthermore, the selection of the presentation 310 component group 302 causes an update to the component data structure 404. Components associated with the presentation 310 such as the informational panels 410 and 412 are tagged within the component data structure 404 for transmission to an accessibility module 406. Other components not associated with the presentation 310 are not transmitted to the accessibility module 406. Accordingly, the informational panels 410 and 412 can be processed by an accessibility module 406 at a computing device 114 to enable a user with disabilities to gain a sense of space and orient themselves within the virtual environment 100 with respect to the virtual screen 104.

Figure 4D:
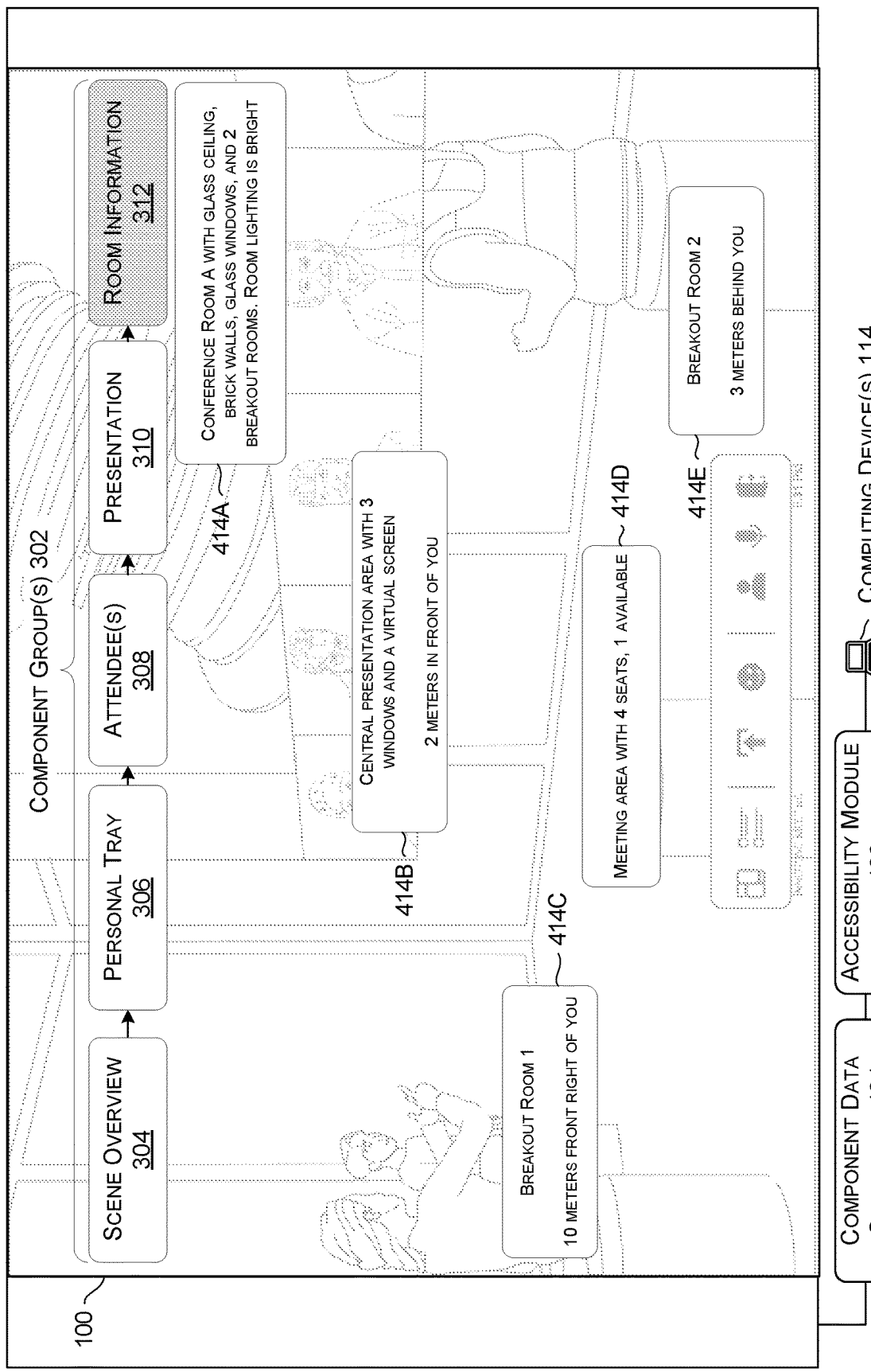
FIG. 4D illustrates a fourth interaction in response to a user input selecting a component group.

As shown now in FIG. 4D, the user selects the room information 312 from the component groups 302. In response, additional informational panels 414A-414E are generated and positioned within the three-dimensional environment 100. The informational panels 414A-414E provide additional information on the appearance and spaces within the three-dimensional environment 100. For example, the informational panel 414A states that the user currently in conference room A which comprises a glass ceiling, brick walks, glass windows, and two breakout rooms to facilitate small group meetings. In addition, the informational panel 414A states that the current lighting in the room is bright. Similarly, the informational panel 414D states that the meeting includes four seats and that one seat is available. In this way, a blind or visually impaired user can visualize the three-dimensional environment 100 without necessarily viewing the space physically. Other informational panels 414B, 414C, and 414E provide information on additional features of the three-dimensional environment 100 in terms of their distance to the user. For instance, the informational panel 414C states that break room 1 is ten meters to the front right of the user. Consequently, in this example, components (e.g., user interface elements) that are displayed and/or read out are associated with a shared attribute such as "virtual environment composition" (e.g., the layout or arrangement of less important aspects of the room—walls, windows, tables, etc.)

In addition, the user selection of the room information component group 312 causes an update to the component data structure 404. Components of the room information component group 312 such as the informational panels 414A-414E are tagged within the component data structure 404 for transmission to the accessibility module 406. Conversely, components not associated with the room information 312 group are not tagged for transmission to the accessibility module 406. The informational panels 414A-414E are then processed by the accessibility module 406 and communicated to a user via the computing device 144 (e.g., through a screen reader). Stated another way, selecting the room information component group 312 can cause the system to produce and transmit a summary of the three-dimensional environment 100 to the user. This further enhances the user's sense of space within the three-dimensional environment 100 and empowers users with disabilities to richly interact with the space.

By presenting information in a layered, hierarchical format using the component groups 302, the disclosed techniques improve the quality of the user experience for users with disabilities (e.g., blind, visually impaired). For instance, a three-dimensional environment 100 can be highly complex containing many objects, renderings of users, virtual screens, additional rooms, and so forth. Rather than bombard a blind user with disjointed information, the component groups 302 improve the user's perception of the space by organizing the constituent components of the three-dimensional environment 100 into well-defined layers based on shared attributes (e.g., session, info, UI, user renderings). Moreover, by empowering users with disabilities with options for customizing how and when to receive information, the disclosed techniques can provide equity in experience for all users.

Figure 5:
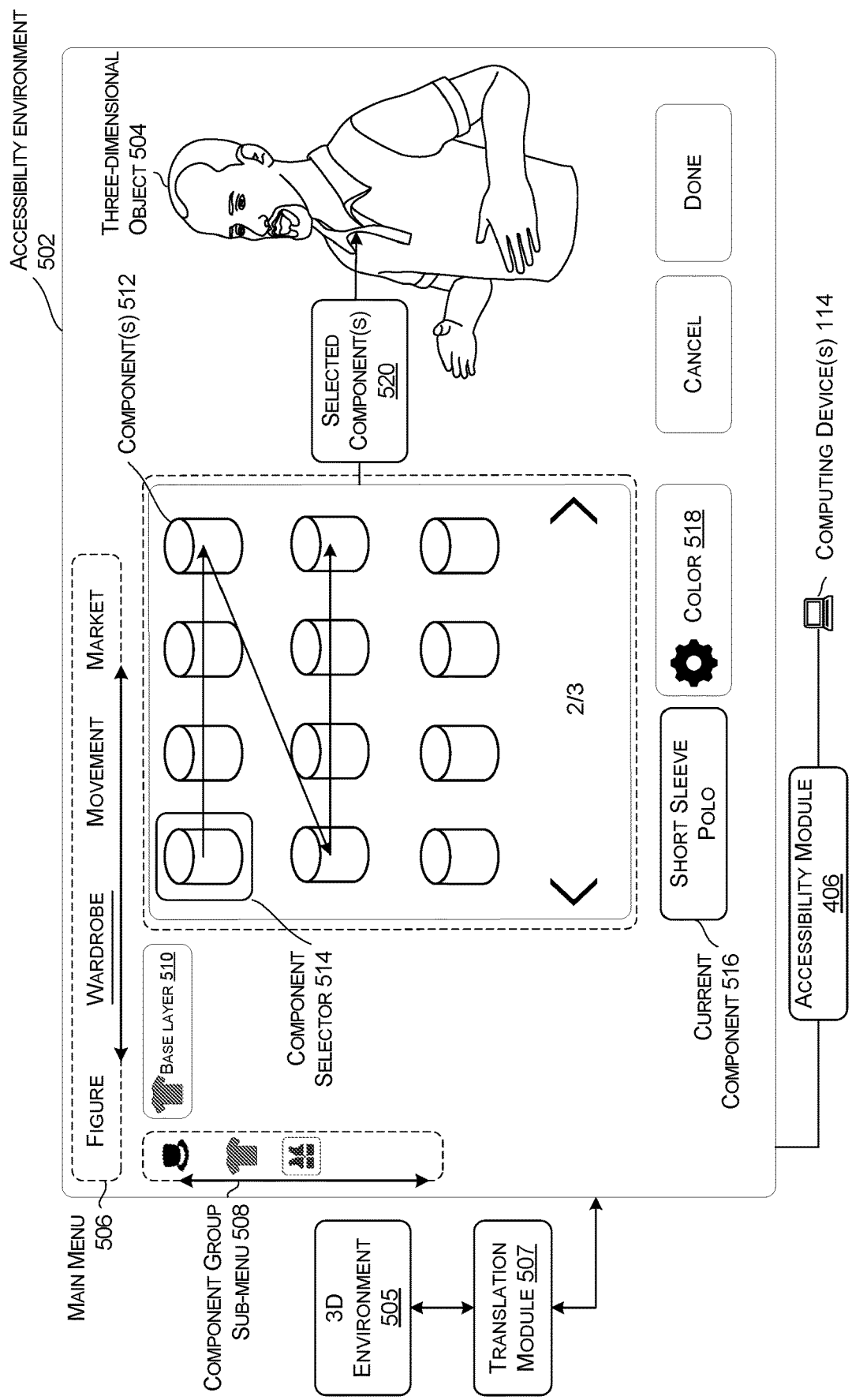
FIG. 5 illustrates an accessibility environment for constructing a three-dimensional object using simplified inputs to interact with component groups.

Turning now to FIG. 5, aspects of an accessibility environment 502 for creating and customizing a three-dimensional object 504 are shown and discussed. In various examples, a three-dimensional experience (e.g., a 3D real-time development platform such as UNITY) such as an avatar customizer is translated into a user accessible experience such as a two-dimensional experience (e.g., in HTML) to accommodate various user needs. Similar to the above examples, this can be accomplished by translating a three-dimensional environment 505 (e.g., a wardrobe) using a translation module 507. For example, a user with limited mobility may not be able to utilize handheld remotes to interact with a three-dimensional experience and require simplified inputs via a keyboard. In another example, a visually impaired user can utilize a screen reader to navigate user interfaces thereby requiring a transformation of the three-dimensional environment 505 for interoperability with the screen reader.

As shown, the accessibility environment 502 includes a main menu 506 encapsulating broad categories of functionality in which a user can advanced through and select a category with a first user input. For instance, the main menu 506 includes a section for the figure of the three-dimensional object 504, in this case, a user avatar. The figure defines general appearance such as gender, facial features, and other aspects. In the current example, the user is focused on the wardrobe section in which the user can select clothing items, accessories, and other components of their avatar object 504. Within the wardrobe section, the user can then select from a component group sub-menu 508 such as the base layer component group 510. The base layer component group 510 further comprises a plurality of components 512 including clothing items such as shirts which the user can place on their avatar object 504.

Utilizing a component selector 514 and a well-defined flow through the components 512 as indicated by the arrows, the user can utilize a simple input (e.g., arrow keys) to advance through the components 512. In addition, a current component 516 indicates which component 512 is presently highlighted by the component selector 514 (e.g., a short sleeve polo). Furthermore, the accessibility environment 502 can receive additional inputs for customizing the appearance of the current component 516 such as the color 518 although other aspects of the component can be modified as well (e.g., size). By providing another user input, the user can subsequently confirm selection of the current component 516. The final selected component 520 is then applied to the three-dimensional object 504.

Organizing what was originally a three-dimensional experience into a hierarchical flow of menus within an accessibility environment 502 enables processing by an accessibility module 406 similar to the examples described above. For instance, the accessibility module 406 can be a screen reader which utilizes audio to inform a user of their current location within the menus (e.g., main menu 506, component group sub-menu 508, components 512). In another example, the accessibility module 406 is a simplified input system for accommodating users with limited dexterity and/or mobility. In still another example, the accessibility module 406 is a force feedback device that provides a haptic force for informing the user of their environment. Providing the hierarchical menus to the simplified input system improves the efficiency of the accessibility module 406 and thereby the overall experience for users with disabilities.

Figure 6A:
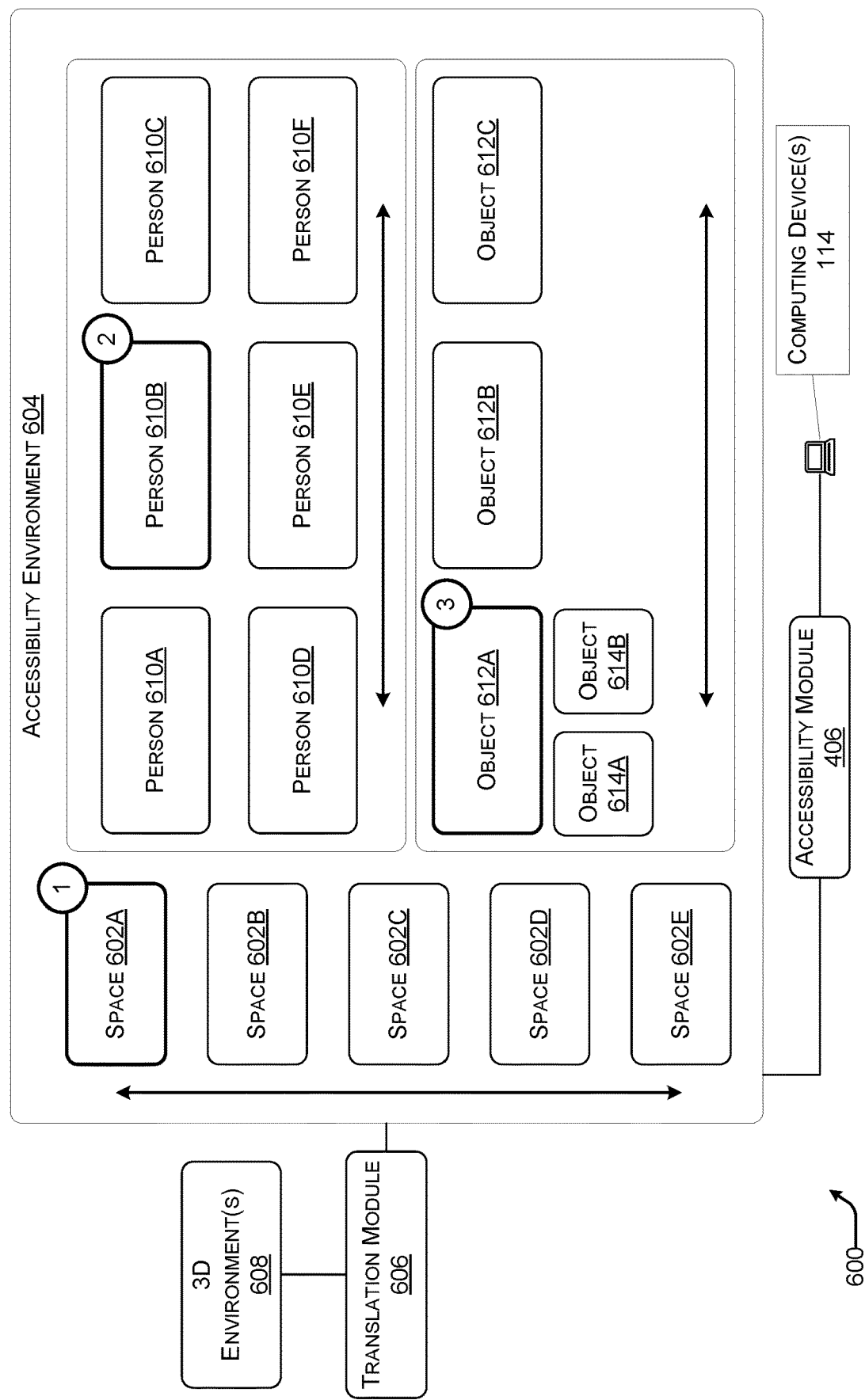
FIG. 6A illustrates an accessibility environment for navigating and understanding a three-dimensional environment using simplified inputs and assistive technology in a first phase of operation.

Proceeding to FIG. 6A, another example of an interaction flow 600 for interacting with a plurality of spaces 602A-602E within in an accessibility environment 604. In various examples, a space 602A can be a three-dimensional space 100 such as the ones described above. As a user can be involved in different spaces 602A-602E, the translation module 606 can extract data from multiple three-dimensional environments 608 to construct the accessibility environment 604.

As shown in FIG. 6A, a user can interact with the accessibility environment 604 by selecting a space 602A. This can be achieved through any combination of input modality and assistive technology that accommodates the unique situation of each user. For instance, a user who is blind can utilize keyboard inputs and a screen reading to cycle through the spaces 602A-602E assisted by a screen reader via the accessibility module. In another example, the user may utilize voice inputs to interact with the accessibility environment 604. Accordingly, the user can say the name of the space 602A to make their selection (e.g., "development team meeting space") and proceed to similarly interact with various entities contained in the space 602A.

Within a space 602A, the user can subsequently select from a set people 610A-610F and/or objects 612A-612C which can be grouped based on an entity type (e.g., people, inanimate objects). The set of people 610A-610F and objects 612A-612C can be analogous to and function similarly to the component group submenu 508 and component selector 514 discussed above. Namely, that people 610A-610F and objects 612A-612C can be considered components of a space 602A. As will be discussed below, selecting a person 610B from the set of people 610A-610F can expose a set of interactions that the user can take with respect to the person 610B. Similarly, the user can additionally select an object 612A to perform other interactions and/or invoke functionality within the space 602A. Moreover, an individual object 612A can have additional objects 614A and 614B nested within. The additional objects 614A and 614B may be physically associated with the object 612A (e.g., cushions on a couch). In this way, the accessibility environment 604 can enable a user with disabilities to take a layered approach to interacting with spaces 602A-602E, people 610A-610F, and objects 612A-614B.

Figure 6B:
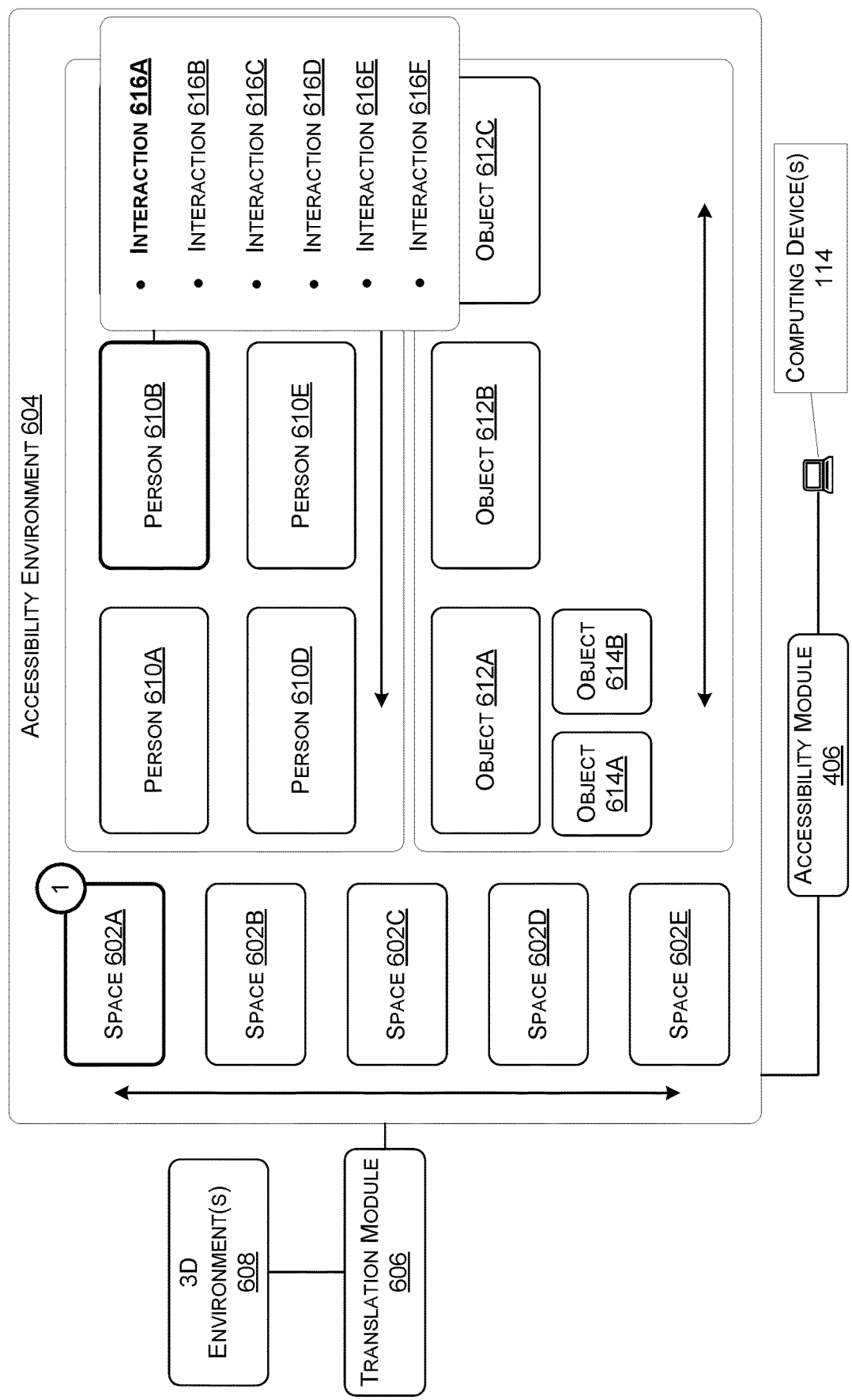
FIG. 6B illustrates an accessibility environment for navigating and understanding a three-dimensional environment using simplified inputs and assistive technology in a second phase of operation.

Proceeding to FIG. 6B, in response to selecting an entity within the space 602A such as the person 610B, the accessibility environment 604 can surface a set of interactions 616A-616F that define various actions that can be taken with respect to the selected entity. For example, an interaction 616A can cause the user to follow the person 610B within the space 602A. Accordingly, a position of the user within the space 602A can change to match a position of the person 610B. Upon following the person 610B using the interaction 616A, the set of interactions 616A-616F may change as the position and thus the immediate context of the user has changed. For instance, now that the user is near the person 610B, an interaction 616B can enable the user to greet the person 610B. Another interaction 616C can enable the user to speak to the person 610B.

The set of interactions 616A-616F can also change and adapt to nearby objects 612A-612C. For example, an interaction 616C can enable the user to manipulate a nearby object 612A while speaking to a person 610B (e.g., a visual aid). In this way, the set of interactions 616A-616F can dynamically adjust to the immediate special and social context of the user. As such, rather than passively attending a space 602A, the user can be empowered to craft a personal experience for themselves through enhanced agency provided by the accessibility environment.

Furthermore, the interactions 616A-616F can be configured to react to events within the space 602A. For instance, a sound can cause the set of interactions 616A-616F to update and focus on a person 610B and/or object 612B associated with the sound. In a specific example, a person 610B may use an audio queue to get the attention of users within the space 602A. In response, an interaction 616D can be updated to enable the user to focus on the person 610B (e.g., turning an avatar). Moreover, sounds that cause the set of interactions 616A-616F to update can include a spatial component. For example, a user who is blind can receive audio via the accessibility module 406 that is formatted for providing a sense of directional perception (e.g., panned right).

Moreover, the interactions 616 can continuously update as a context of the user changes. For instance, in a social context, if the user is actively interacting with a person 610B, an interaction 616A can adapt accordingly to provide the user with options to enrich the interaction (e.g., virtual emotes) and/or switch focus to another person 610C. In another example, the interactions 616 can adapt to a spatial context of the user. For example, in response to a user moving into a section of a three-dimensional space 602A (e.g., a breakout room), the interactions 616 can enable the user to interact with nearby objects 612, people 610, and the like.

In addition, audio queues for updating the set of interactions 616A-616F can be customized for user preferences. For example, a user can configure the accessibility environment 604 to generate an audio queue in response to a person 610B approaching. Stated another way, if a person 610B moves within a threshold distance of the present location of the user, a spatial audio queue can be generated to indicate the direction of the approaching person 610B and the set of interactions 616A-616F can be updated accordingly. For example, in response to a person 610B approaching from the left, the accessibility module 406 can generate a spatial audio queue that appears to originate from the left of the user to draw their attention.

In another example, spatial audio can be triggered when a user faces, interacts with, or is within proximity of an object 612A. For instance, moving a cursor within the accessibility environment can translate to movement within the three-dimensional environment of a space 602A (e.g., turning around). In response to moving a cursor to change a direction, the accessibility module 406, along with the translation module 606, can trigger audio that is embedded in the space 602A for people 610 and/or objects 612 in the direction. For instance, spatial audio can be triggered in response to the user moving a cursor to turn and face a person 610B. If the person is speaking, the speech audio can be transmitted to the user via the accessibility module 406. Alternatively, a simple audio queue can be triggered to inform the user that there is a person 610B in the direction they are facing. Such audio queues can be customized to play for different events and/or triggers. In this way, the set of interactions 616A-616F can enable a user who is disabled to richly interact with the three-dimensional environment of a space 602A.

Figure 7:
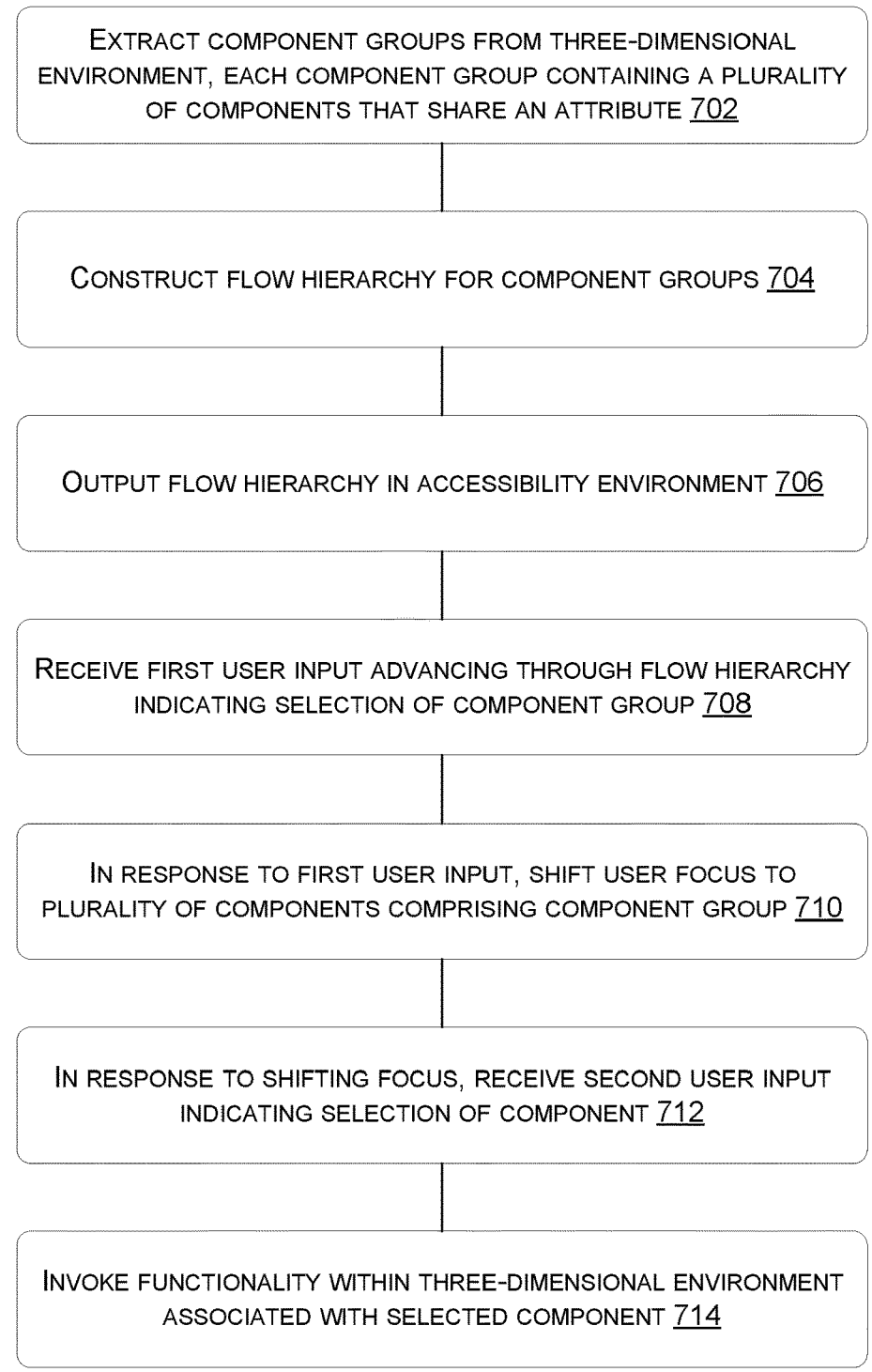
FIG. 7 is a flow diagram showing aspects of a routine for translating a three-dimensional environment to an accessibility environment to enable interoperability between a three-dimensional experience and accessibility tools is shown and described.

Turning now to FIG. 7, aspects of a routine 700 for translating a three-dimensional environment to an accessibility environment to enable interoperability between a three-dimensional experience and accessibility tools is shown and described. With reference to FIG. 7, the routine 700 begins at operation 702 where the system extracts component groups from a three-dimensional environment. Each component group includes components having a shared attribute. For example, the shared attribute is a component type (e.g., UI elements, user renderings, furniture). In another example, the shared attribute is location (e.g., left side of the room, right side of the room). In still another example, the shared attribute is a geometrical boundary (e.g., components within a certain area of a room) or other virtual constraint.

Next, at operation 704, the system constructs a flow hierarchy for the component groups.

Then, at operation 706, the flow hierarchy is output in an accessibility environment (e.g., a two-dimensional menu, an auditory environment).

At operation 708, the system receives a first user input via the accessibility environment indicating a selection of one of the component groups.

Next, at operation 710, in response to the first user input, the system shifts a focus to the components comprising the selected component group.

Subsequently, at operation 712, the system receives a second user input in response to the shifted focus indicating a selection of a component from the component group.

Finally, at operation 714, the system invokes functionality within the three-dimensional environment associated with the selected component.

Figure 8:
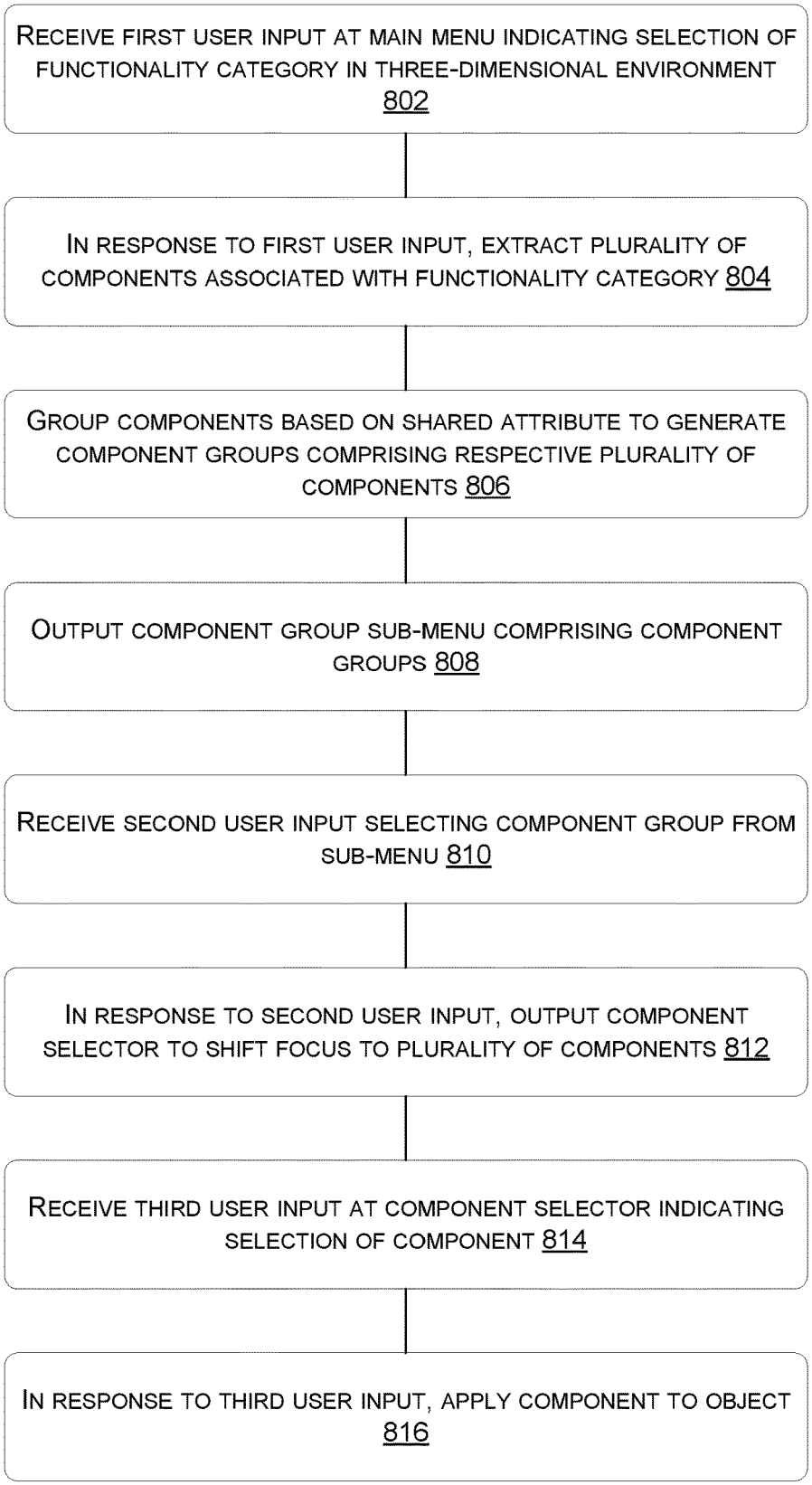
FIG. 8 is a flow diagram showing aspects of a routine for utilizing an accessibility environment to create an object for use in a three-dimensional environment.

Turning now to FIG. 8, aspects of a routine 800 for utilizing an accessibility environment to create an object for use in a three-dimensional environment are described. With reference to FIG. 8 the routine 800 begins at operation 802 where a system receives a first user input at a main menu indicating a selection of a category of functionality within the three-dimensional environment.

Next, at operation 804, the system extracts a plurality of components associated with the selected category of functionality.

Then, at operation 806, the extracted components are grouped based on a shared attribute to generate component groups where each component group comprises a respective plurality of components.

Proceeding to operation 808, the system outputs a component group sub-menu comprising the component groups.

Next, at operation 810, the system receives a second user input indicating a selection of one of the component groups from the sub-menu.

Then, at operation 812, in response to the second user input, the system outputs a component selector to shift a focus to the plurality of components within the selected component group.

At operation 814, the system receives a third user input via the component selector indicating a selection of a component.

Finally, at operation 816, in response to the third user input, the system applies the selected component to the object. In addition, operations 810-816 can be repeated until the object (e.g., a user avatar) is fully customized to the user's liking.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 700 and 800 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routines 700 and 800 may be also implemented in other ways. In addition, one or more of the operations of the routines 700 and 800 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 9:
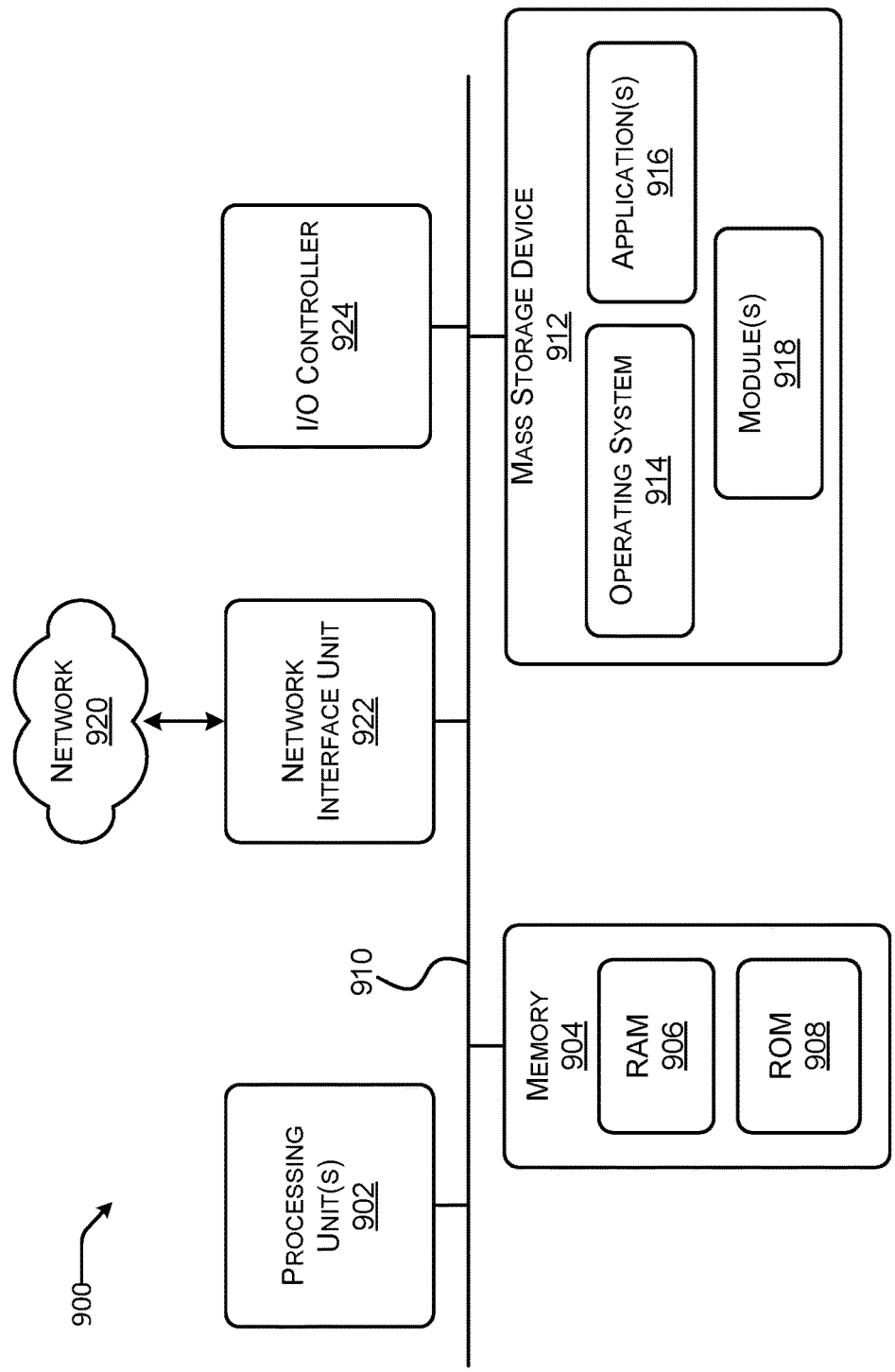
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the cloud-based platform or system 100, capable of executing computer instructions (e.g., a module or a program component described herein). The computer architecture 900 illustrated in FIG. 9 includes processing system 902, a system memory 904, including a random-access memory 906 (RAM) and a read-only memory (ROM) 908, and a system bus 910 that couples the memory 904 to the processing system 902. The processing system 902 comprises processing unit(s). In various examples, the processing unit(s) of the processing system 902 are distributed. Stated another way, one processing unit of the processing system 902 may be located in a first location (e.g., a rack within a datacenter) while another processing unit of the processing system 902 is located in a second location separate from the first location.

Processing unit(s), such as processing unit(s) of processing system 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 919, and other data described herein.

The mass storage device 912 is connected to processing system 902 through a mass storage controller connected to the bus 910. The mass storage device 912 and its associated computer-readable media provide non-volatile storage for the computer architecture 900. Although the description of computer-readable media contained herein refers to a mass storage device, the computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

The software components described herein may, when loaded into the processing system 902 and executed, transform the processing system 902 and the overall computer architecture 900 from a general-purpose computing system into a special-purpose computing system customized to facilitate the functionality presented herein. The processing system 902 may be constructed from any number of transistors or other discrete circuit elements, which may individually or collectively assume any number of states. More specifically, the processing system 902 may operate as a finite-state machine, in response to executable instructions contained within the software modules disclosed herein. These computer-executable instructions may transform the processing system 902 by specifying how the processing system 902 transition between states, thereby transforming the transistors or other discrete hardware elements constituting the processing system 902.

Figure 10:
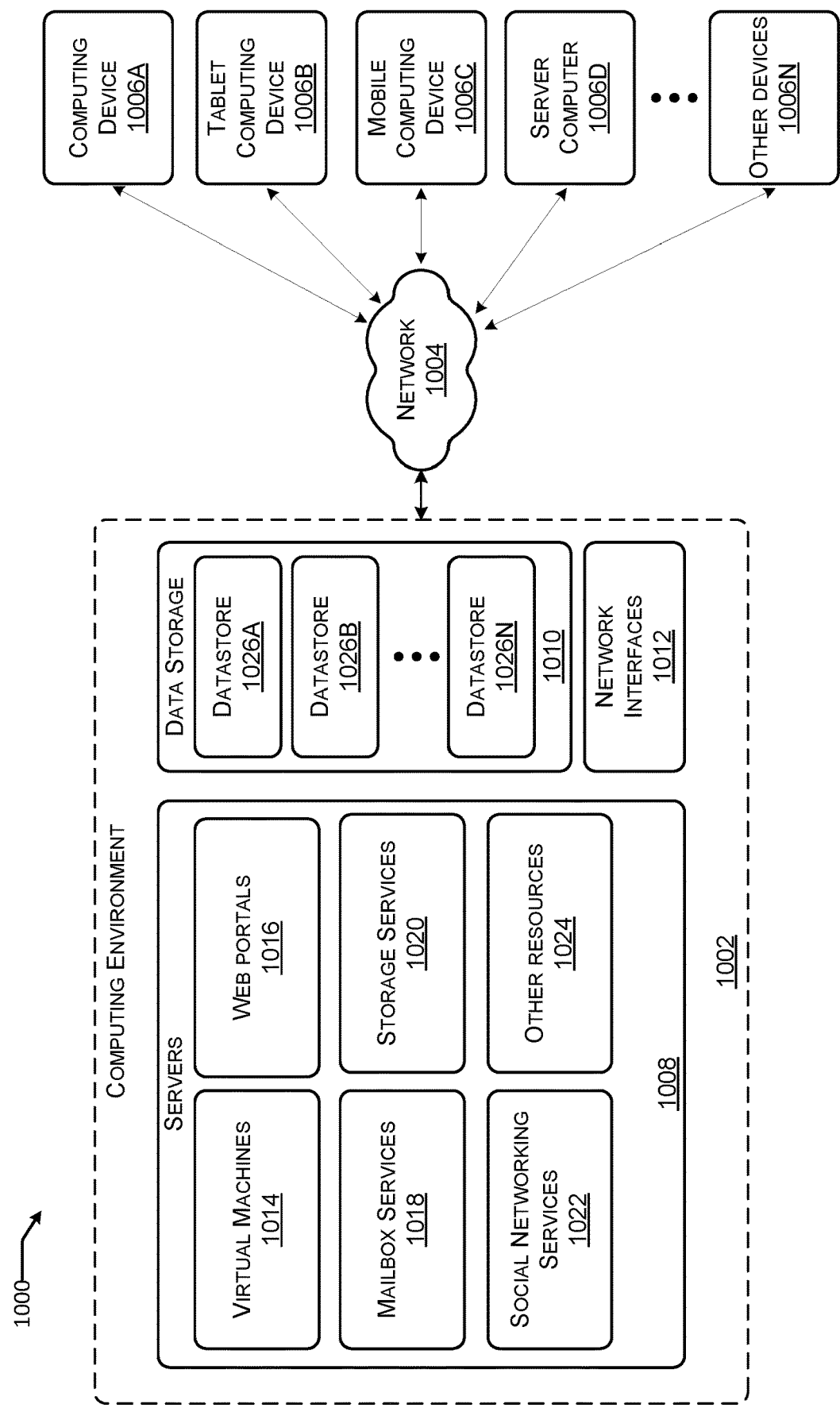
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein. Accordingly, the distributed computing environment 1000 can include a computing environment 1002 operating on, in communication with, or as part of the network 1004. The network 1004 can include various access networks. One or more client devices 1006A-1006N (hereinafter referred to collectively and/or generically as "computing devices 1006") can communicate with the computing environment 1002 via the network 1004. In one illustrated configuration, the computing devices 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of computing devices 1006 can communicate with the computing environment 1002.

In various examples, the computing environment 1002 includes servers 1008, data storage 1010, and one or more network interfaces 1012. The servers 1008 can host various services, virtual machines, portals, and/or other resources. In the illustrated configuration, the servers 1008 host virtual machines 1014, Web portals 1016, mailbox services 10110, storage services 1020, and/or social networking services 1022. As shown in FIG. 10 the servers 1008 also can host other services, applications, portals, and/or other resources ("other resources") 1024.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more servers configured to host data for the computing environment 1000. The data storage 1010 can include, host, or provide one or more real or virtual datastores 1026A-1026N (hereinafter referred to collectively and/or generically as "datastores 1026"). The datastores 1026 are configured to host data used or created by the servers 1008 and/or other data. That is, the datastores 1026 also can host or store web page documents, word documents, presentation documents, data structures, algorithms for execution by a recommendation engine, and/or other data utilized by any application program. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects.

The disclosure presented herein also encompasses the subject matter set forth in the following clauses.

Example Clause A, a method for translating a rendering of a three-dimensional environment for interaction in an accessibility environment comprising: extracting a plurality of component groups from the three-dimensional environment, an individual component group comprising a plurality of components that share an attribute; constructing a flow hierarchy for the plurality of component groups; outputting the flow hierarchy in the accessibility environment; receiving a first user input at the accessibility environment advancing through the flow hierarchy indicating a selection of a component group from the plurality of component groups; in response to the first user input, shifting a focus to the plurality of components comprising the component group; in response to shifting the focus, receiving a second user input at the accessibility environment indicating a selection of a component of the plurality of components comprising the component group; and invoking a functionality within the three-dimensional environment associated with the component selected by the second user input.

Example Clause B, the method of Example Clause A, wherein the flow hierarchy comprises a user interface component group, an attendee component group, a content component group, and an environment component group.

Example Clause C, the method of Example Clause A or Example Clause B, wherein the plurality of component groups of the flow hierarchy is ranked based on a priority assigned to each component group.

Example Clause D, the method of any one of Example Clause A through C, wherein: the first user input and the second user input comprise a keyboard input navigating a user avatar within the three-dimensional environment; and the first user input and the second user input cause a spatial audio output indicating a respective component group and component.

Example Clause E, the method of any one of Example Clause A through D, wherein the selection of the component group causes a generation of a plurality of informational panels for each component of the component group.

Example Clause F, the method of Example Clause E, wherein the informational panels identify an associated component and a distance relative to a current position of a user within the three-dimensional environment.

Example Clause G, the method of Example Clause E, wherein the plurality of informational panels is processed by an accessibility module to generate an audio output describing the component group.

Example Clause H, a system for translating a rendering of a three-dimensional environment for interaction in an accessibility environment comprising: one or more processing units; and a computer-readable medium having encoded thereon computer-readable instructions that when executed by the one or more processing units, causes the system to: extract a plurality of component groups from the three-dimensional environment, an individual component group comprising a plurality of components that share an attribute; construct a flow hierarchy for the plurality of component groups; output the flow hierarchy in the accessibility environment; receive a first user input at the accessibility environment advancing through the flow hierarchy indicating a selection of a component group from the plurality of component groups; in response to the first user input, shift a focus to the plurality of components comprising the component group; in response to shifting the focus, receive a second user input at the accessibility environment indicating a selection of a component of the plurality of components comprising the component group; and invoke a functionality within the three-dimensional environment associated with the component selected by the second user input.

Example Clause I, the system of Example Clause H, wherein the flow hierarchy comprises a user interface component group, an attendee component group, a content component group, and an environment component group.

Example Clause J, the system of Example Clause H or Example Clause I, wherein the plurality of component groups of the flow hierarchy is ranked based on a priority assigned to each component group.

Example Clause K, the system of any one of Example Clause H through J, wherein: the first user input and the second user input comprise a keyboard input navigating a user avatar within the three-dimensional environment; and the first user input and the second user input cause a spatial audio output indicating a respective component group and component.

Example Clause L, the system of Example Clause H, wherein the selection of the component group causes a generation of a plurality of informational panels for each component of the component group.

Example Clause M, the system of Example Clause L, wherein the informational panels identify an associated component and a distance relative to a current position of a user within the three-dimensional environment.

Example Clause N, the system of Example Clause L, wherein the plurality of informational panels is processed by an accessibility module to generate an audio output describing the component group.

Example Clause O, a computer readable storage medium having encoded thereon, computer readable instructions that when executed by a system causes the system to: extract a plurality of component groups from a three-dimensional environment, an individual component group comprising a plurality of components that share an attribute; construct a flow hierarchy for the plurality of component groups; output the flow hierarchy in an accessibility environment; receive a first user input at the accessibility environment advancing through the flow hierarchy indicating a selection of a component group from the plurality of component groups; in response to the first user input, shift a focus to the plurality of components comprising the component group; in response to shifting the focus, receive a second user input at the accessibility environment indicating a selection of a component of the plurality of components comprising the component group; and invoke a functionality within the three-dimensional environment associated with the component selected by the second user input.

Example Clause P, the computer readable storage medium of Example Clause O, wherein the flow hierarchy comprises a user interface component group, an attendee component group, a content component group, and an environment component group.

Example Clause Q, the computer readable storage medium of Example Clause O or Example Clause P, wherein the plurality of component groups of the flow hierarchy is ranked based on a priority assigned to each component group.

Example Clause R, the computer readable storage medium of any one of Example Clause O through Q, wherein: the first user input and the second user input comprise a keyboard input navigating a user avatar within the three-dimensional environment; and the first user input and the second user input cause a spatial audio output indicating a respective component group and component.

Example Clause S, the computer readable storage medium of any one of Example Clause O through R, wherein the selection of the component group causes a generation of a plurality of informational panels for each component of the component group.

Example Clause T, the computer readable storage medium of Example Clause S, wherein the plurality of informational panels is processed by an accessibility module to generate an audio output describing the component group.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different avatars).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for rendering a three-dimensional environment for a user participating in the three-dimensional environment via an accessibility environment, the method comprising:
   extracting a plurality of different component groups from the three-dimensional environment, an individual component group including a plurality of components that share an attribute;
   constructing a flow hierarchy for the plurality of different component groups, wherein the flow hierarchy organizes the plurality of different component groups based on a likelihood of user interaction;
   causing the flow hierarchy to be displayed in the accessibility environment;
   receiving a first user input at the accessibility environment advancing through the flow hierarchy indicating a selection of a component group from the plurality of different component groups;
   in response to the first user input:
      causing a plurality of user interface elements respectively associated with the plurality of components included in the selected component group to be displayed in the accessibility environment, wherein each user interface element of the plurality of user interface elements provides information for an associated component; and
      generating an audio output describing the plurality of user interface elements;
   receiving a second user input at the accessibility environment indicating a selection of a component of the plurality of components included in the selected component group; and
   invoking a functionality within the three-dimensional environment associated with the selected component.

2. The method of claim 1, wherein the flow hierarchy comprises a user interface component group, an attendee component group, a content component group, and an environment component group.

3. The method of claim 1, wherein:
   the first user input and the second user input comprise a keyboard input navigating a user avatar within the three-dimensional environment; and
   the first user input and the second user input cause a spatial audio output indicating the selected component group and the selected component.

4. The method of claim 1, wherein each user interface element of the plurality of user interface elements provides a distance of the associated component relative to a current position of the user participating in the three-dimensional environment via the accessibility environment.

5. A system for rendering a three-dimensional environment for a user participating in the three-dimensional environment via an accessibility environment, the system comprising:
   one or more processing units; and
   a computer-readable storage medium having encoded thereon computer-readable instructions that, when executed by the one or more processing units, causes the system to:
      extract a plurality of different component groups from the three-dimensional environment, an individual component group including a plurality of components that share an attribute;
      construct a flow hierarchy for the plurality of different component groups, wherein the flow hierarchy organizes the plurality of different component groups based on a likelihood of user interaction;
      cause the flow hierarchy to be displayed in the accessibility environment;
      receive a first user input at the accessibility environment advancing through the flow hierarchy indicating a selection of a component group from the plurality of different component groups;
      in response to the first user input, cause a plurality of user interface elements respectively associated with the plurality of components included in the selected component group to be displayed in the accessibility environment, wherein each user interface element of the plurality of user interface elements provides information for an associated component;
      receive a second user input at the accessibility environment indicating a selection of a component of the plurality of components included in the selected component group;
      generate an audio output describing a user interface element associated with the selected component; and
      invoke a functionality within the three-dimensional environment associated with the selected component.

6. The system of claim 5, wherein the flow hierarchy comprises a user interface component group, an attendee component group, a content component group, and an environment component group.

7. The system of claim 5, wherein:
   the first user input and the second user input comprise a keyboard input navigating a user avatar within the three-dimensional environment; and
   the first user input and the second user input cause a spatial audio output the selected component group and the selected component.

8. The system of claim 5, wherein each user interface element of the plurality of user interface elements provides a distance relative to a current position of the user participating in the three-dimensional environment via the accessibility environment.

9. A computer readable storage medium having encoded thereon, computer readable instructions that, when executed by a system, causes the system to:
   extract a plurality of different component groups from a three-dimensional environment, an individual component group including a plurality of components that share an attribute;
   construct a flow hierarchy for the plurality of different component groups, wherein the flow hierarchy organizes the plurality of different component groups based on a likelihood of user interaction;
   cause the flow hierarchy to be displayed in an accessibility environment;
   receive a first user input at the accessibility environment advancing through the flow hierarchy indicating a selection of a component group from the plurality of different component groups;
   in response to the first user input, cause a plurality of user interface elements respectively associated with the plurality of components included in the selected component group to be displayed in the accessibility environment, wherein each user interface element of the plurality of user interface elements provides information for an associated component;

receive a second user input at the accessibility environment indicating a selection of a component of the plurality of components included in the selected component group;

generate an audio output describing a user interface element associated with the selected component; and invoke a functionality within the three-dimensional environment associated with the selected component.

10. The computer readable storage medium of claim 9, wherein the flow hierarchy comprises a user interface component group, an attendee component group, a content component group, and an environment component group.

11. The computer readable storage medium of claim 9, wherein:

the first user input and the second user input comprise a keyboard input navigating a user avatar within the three-dimensional environment; and the first user input and the second user input cause a spatial audio output indicating a respective the selected component group and the selected component.

12. The computer readable storage medium of claim 9, wherein each user interface element of the plurality of user interface elements provides a distance of the associated component relative to a current position of a user participating in the three-dimensional environment via the accessibility environment.

* * * * *